(12) United States Patent
Dewolf et al.

(10) Patent No.: US 11,474,000 B2
(45) Date of Patent: Oct. 18, 2022

(54) MITIGATION OF RESONANCE IN A TRANSPORT REFRIGERATION UNIT

(71) Applicant: Carrier Corporation, Palm Beach Gardens, FL (US)

(72) Inventors: Thomas Dewolf, Clay, NY (US); Richard Clark, Fulton, NY (US); Robert A. Chopko, Baldwinsville, NY (US); Christopher G. Repice, Camillus, NY (US); Michael Balistreri, Baldwinsville, NY (US); Jason A. Gough, Marcellus, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 883 days.

(21) Appl. No.: 16/357,939

(22) Filed: Mar. 19, 2019

(65) Prior Publication Data

US 2019/0285510 A1 Sep. 19, 2019

Related U.S. Application Data

(60) Provisional application No. 62/644,822, filed on Mar. 19, 2018.

(51) Int. Cl.
*G01M 7/02* (2006.01)
*G01H 13/00* (2006.01)
(Continued)

(52) U.S. Cl.
CPC ........ *G01M 7/022* (2013.01); *B60H 1/00364* (2013.01); *B60H 1/00735* (2013.01);
(Continued)

(58) Field of Classification Search
CPC ............ B60H 1/00364; B60H 1/00507; B60H 1/00735; B60H 1/32; B60H 1/3205;
(Continued)

(56) References Cited

U.S. PATENT DOCUMENTS

| 4,012,942 A | 3/1977 | Harned |
| 4,608,650 A | 8/1986 | Kapadia |

(Continued)

FOREIGN PATENT DOCUMENTS

| GB | 2413850 B | 9/2007 |
| KR | 19980030279 A | 8/1998 |

(Continued)

OTHER PUBLICATIONS

European Patent Office, Extended European Search Report, Application No. 19163874.1-1204, dated May 24, 2019 (8 pp.).

*Primary Examiner* — David L Singer
(74) *Attorney, Agent, or Firm* — Cantor Colburn LLP

(57) ABSTRACT

A system for dynamically mitigating resonance in a transport refrigeration unit (TRU) during a mission, having: a TRU controller configured for operating a TRU engine during the mission according to an operational baseline, and while operating the TRU engine, contemporaneously performing steps including: obtaining a first set of data that comprises real time measurements from one or more accelerometers installed in the TRU; converting the real measurements to a second set of data that comprises real time shock and vibration data; processing the second set of data in a control loop to determine an updated operational baseline that avoids resonance detected in the first set of data; and operating the TRU engine according to the updated operational baseline.

10 Claims, 4 Drawing Sheets

(51) Int. Cl.
*G06F 7/02* (2006.01)
*B60H 1/00* (2006.01)
*B60H 1/32* (2006.01)
*F25B 49/00* (2006.01)
*G05D 19/02* (2006.01)
*G08B 17/06* (2006.01)

(52) U.S. Cl.
CPC ........... *B60H 1/3205* (2013.01); *F25B 49/00* (2013.01); *G01H 13/00* (2013.01); *G01M 7/025* (2013.01); *G05D 19/02* (2013.01); *G06F 7/026* (2013.01); *B60H 1/3232* (2013.01); *B60H 2001/3272* (2013.01); *G08B 17/06* (2013.01)

(58) Field of Classification Search
CPC .......... B60H 1/3232; B60H 2001/3272; F25B 49/00; G01H 13/00; G01M 7/022; G01M 7/025; G05D 19/02; G06F 7/026; G08B 17/06
See application file for complete search history.

(56) References Cited

U.S. PATENT DOCUMENTS

| | | |
|---|---|---|
| 4,869,474 A | 9/1989 | Best et al. |
| 6,589,135 B2 | 7/2003 | Miller |
| 6,754,571 B2 | 6/2004 | Gade et al. |
| 7,133,761 B2 | 11/2006 | Ancimer |
| 7,547,980 B2 | 6/2009 | Harrison |
| 8,041,500 B2 | 10/2011 | Leone |
| 8,571,829 B2 | 10/2013 | Atlas et al. |
| 8,692,689 B2 | 4/2014 | Czompo |
| 9,841,354 B2 | 12/2017 | Cheung et al. |
| 2006/0198744 A1* | 9/2006 | Lifson .................. F25B 49/025 417/423.1 |
| 2009/0093911 A1* | 4/2009 | Caillat ................ F04B 39/0027 700/280 |
| 2011/0138826 A1* | 6/2011 | Lifson .................. F25B 49/025 62/115 |
| 2013/0156544 A1* | 6/2013 | Sishtla .................. F04D 29/058 415/170.1 |
| 2014/0318162 A1* | 10/2014 | Kopko ................. G10K 11/161 62/126 |
| 2014/0345382 A1 | 11/2014 | Keikkila |
| 2015/0370252 A1* | 12/2015 | Hanson .................... B63B 1/32 701/2 |
| 2017/0158026 A1* | 6/2017 | Menard ................ B60H 1/3222 |
| 2018/0061207 A1 | 3/2018 | Nygren et al. |

FOREIGN PATENT DOCUMENTS

| | | | |
|---|---|---|---|
| KR | 20030034913 A | 5/2003 | |
| KR | 100436573 B1 * | 6/2004 | ............ G01H 11/00 |
| KR | 20090130604 A | 12/2009 | |
| KR | 20120024301 A | 3/2012 | |
| WO | 2017172701 A1 | 10/2017 | |

\* cited by examiner

MITIGATION OF RESONANCE IN A TRANSPORT REFRIGERATION UNIT

CROSS-REFERENCE TO RELATED APPLICATIONS

This application claims the benefit of an earlier filing date from U.S. Provisional Application Ser. No. 62/644,822 filed Mar. 19, 2018, which is incorporated herein by reference in its entirety.

BACKGROUND

Exemplary embodiments pertain to the art of vibration avoidance and more specifically to vibration avoidance in a transport refrigeration unit.

Refrigerated trailers may include a transport refrigeration unit (TRU) to provide proper conditioning for cargo shipped in the trailer. The TRU includes a TRU engine that may propagate a spectrum of vibration energy levels onto various components such as TRU engine mounts, components mounted to the TRU, etc. In some cases, the TRU engine operates at speeds corresponding to one or more resonance frequencies for the components, which may magnify the energy and the effect of the vibrations on the components and lead to component failure.

It may be possible to design the TRU and related components to avoid vibrations at targeted TRU speeds. There may be potential, however, for antiquated or unanticipated configuration variabilities and/or vibrational unbalances in components and products that may result in unpredicted resonance in the TRU engine, TRU engine mounts, related parts or mounted components. Moreover, if TRU engine mount deterioration occurs in the field, such deterioration may result in excessive motion during resonance and may result in TRU engine or TRU component failure.

BRIEF DESCRIPTION

Disclosed is a system for dynamically mitigating resonance in a transport refrigeration unit (TRU) during a mission, comprising: a TRU controller configured for operating a TRU engine during the mission according to an operational baseline, and while operating the TRU engine, and contemporaneously performing steps comprising: obtaining a first set of data that comprises real time measurements from one or more accelerometers installed in the TRU; converting the real measurements to a second set of data that comprises real time shock and vibration data; processing the second set of data in a control loop to determine an updated operational baseline that avoids resonance detected in the first set of data; and operating the TRU engine according to the updated operational baseline.

In addition to a combination of one or more of the above disclosed features and steps, or as an alternate, the operational baseline and updated operational baseline each identifies a frequency of operation for the TRU engine.

In addition to a combination of one or more of the above disclosed features and steps, or as an alternate, the TRU controller forwards one or more of the first set of data, the second set of data and the updated operational baseline to a fleet central server.

In addition to a combination of one or more of the above disclosed features and steps, or as an alternate, the fleet central server receives the one or more of the first set of data, the second set of data and the updated operational baseline and develops one or more of preventative maintenance prognostics and updated design and testing profiles.

In addition to a combination of one or more of the above disclosed features and steps, or as an alternate, the TRU comprises TRU components and the TRU controller compares the second set of data to a first set of reference data indicative of an acceptable vibrational range for the TRU components.

In addition to a combination of one or more of the above disclosed features and steps, or as an alternate, the TRU controller filters, from the second set of data, data indicative real time shock and vibration data that is within the acceptable vibrational range for the TRU components and the TRU controller processes the filtered second set of data in the control loop to determine the updated operational baseline that avoids resonance detected in the first set of data.

In addition to a combination of one or more of the above disclosed features and steps, or as an alternate, the TRU comprises TRU components and the TRU controller compares the second set of data to a second set of reference data indicative of a failure of one or more of the TRU components.

In addition to a combination of one or more of the above disclosed features and steps, or as an alternate, the TRU controller triggers an alarm when determining that the second set of data is indicative of failure of one or more of the TRU components.

In addition to a combination of one or more of the above disclosed features and steps, or as an alternate, the TRU controller compares the second set of data to a third set of reference data indicative pending vibrations.

In addition to a combination of one or more of the above disclosed features and steps, or as an alternate, the TRU controller determines an updated operational baseline that avoids resonance induced by pending vibrations.

Further disclosed is a method for dynamically mitigating resonance in a transport refrigeration unit (TRU) during a mission, comprising on or more of the above disclosed features and/or steps.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
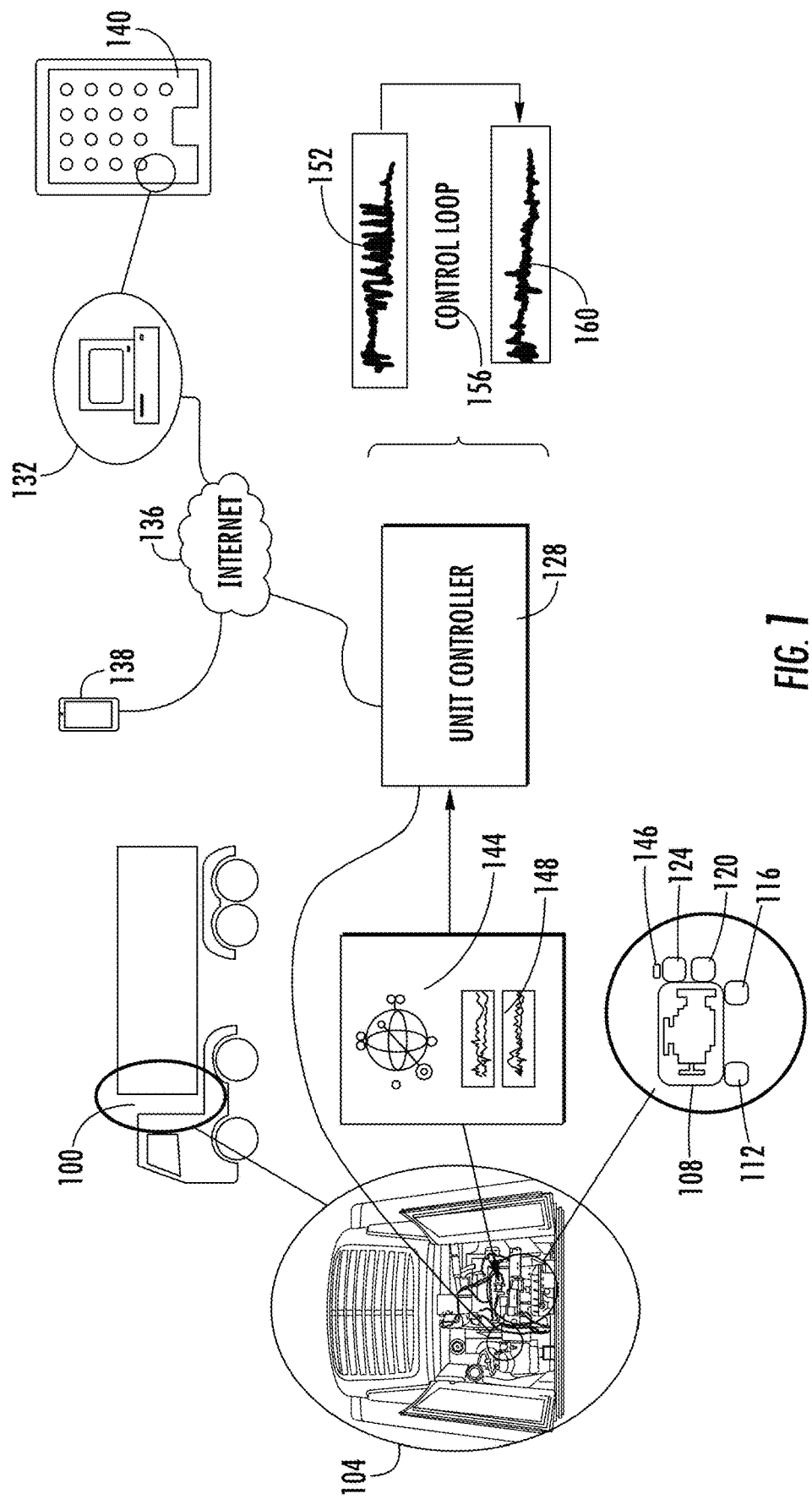
FIG. 1 is an illustration of components according to an embodiment.

Turning to FIG. 1, the operational environment of one embodiment includes a trailer 100 having therein a transport refrigeration unit (TRU) 104. The TRU includes a TRU engine 108 and a plurality of TRU components. The plurality of TRU components includes for example a plurality of TRU engine mounts including a first TRU engine mount 112 and a second TRU engine mount 116. The plurality of TRU components may include a plurality of mounted parts including a first mounted part 120 and a second mounted part 124. The plurality of mounted parts may be of the typical kind found in a TRU, including movable and/or rotating parts that provide necessary services for items transported in the trailer 100.

The TRU engine may be a variable speed engine capable of being dynamically controlled by a TRU controller 128. The TRU controller may be onboard the TRU engine or may be a separate component in the TRU. The TRU controller may communicate with and be programmed by a fleet central server 132. Such communications may occur via cellular or other wireless network 136 or wired network as structured in the fleet headquarters 140. Communications may be directly with one or more cellular devices 138 in possession of an operator of the TRU or with maintenance personnel for diagnostic or other purposes.

According to an embodiment, the disclosed system may include one or more accelerometers including a first accelerometer 144 mounted within the TRU. A second accelerometer 146 may be disposed on the TRU engine and/or on one or more of the TRU components. The accelerometers may be dynamically controlled by the controller 128 or by another controller onboard the TRU. The accelerometers may be capable of measuring and feeding first data 148, representing real time data, to the TRU controller 128. With the addition of accelerometers and feedback to the TRU controller 128, the TRU controller 128 may process the first data 148 to obtain second data 152, representing real time shock and vibration data experienced by the TRU components. The second data can be fed to a control loop 156 that may be executed by the TRU controller. Output 160 from the control loop 156 may be used drive the TRU engine at a frequency that is continuously fine-tuned to avoid resonance.

Figure 2:
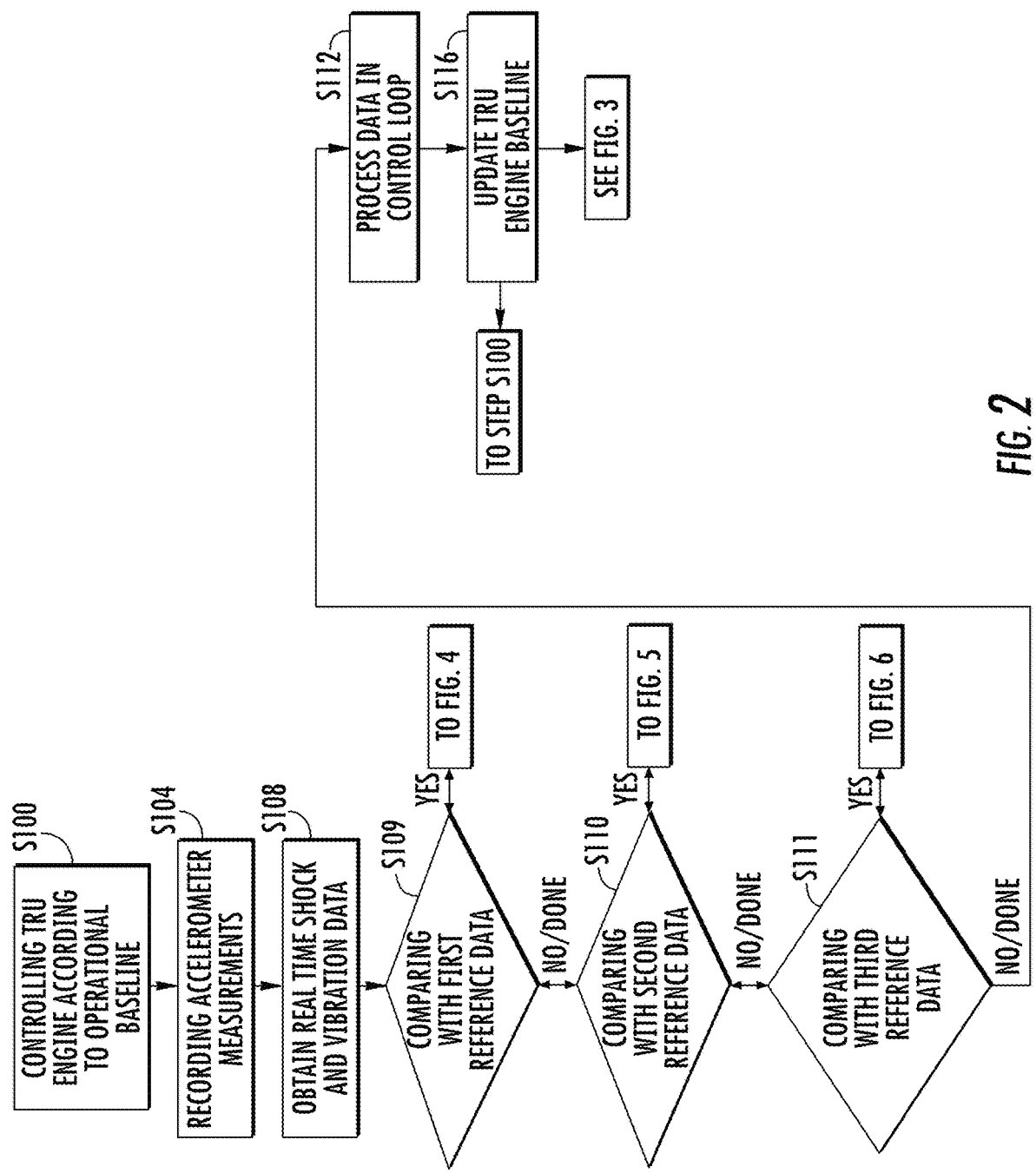
FIG. 2 is a flowchart according to an embodiment.

Turning to FIG. 2, a process is disclosed for mitigating resonance in a TRU. The process includes the TRU controller performing step S100 of controlling the TRU engine according to initial baseline parameters. Such parameters include running the TRU engine a preset operational frequency. The TRU controller then preforms step S104 of recording first data representing real time accelerometer measurements. At step S108 the TRU controller processes the first data to obtain second data representing real time shock and vibrations experienced by the TRU components.

At step S109 the TRU controller may compare the second data with first reference data indicative of an acceptable range of vibrations, as discussed below. At step S110 the TRU controller may compare the second data with second reference data indicative of component failure, as also discussed below. At step S111 the TRU controller may compare the second data with a third reference data indicative of pending further shock, as also discussed in detail below. As illustrated, the TRU controller may perform any combination of steps S109, S110 and S111. The determination at each of steps S109, S110, and S111 may be "yes", "no" or "complete". The response of "complete" may be after responding "yes" to one of these steps and then executing further associated steps, discussed in detail below.

When the determination at each of steps S109, S110 and S111 is "no" or "complete", at step S112 the second data is processed by the TRU controller, through the control loop, to obtain updated baseline parameters for controlling the TRU engine. As indicated, the control loop calculations are designed to run the TRU engine at frequencies that dampen and/or avoid frequencies causing resonance in the TRU components. In one embodiment the control loop may provide for incremental increasing or decreasing of TRU engine speeds. At step S116, the updated baseline parameters are fed to the TRU engine, and the system then cycles back to step S100.

Figure 3:
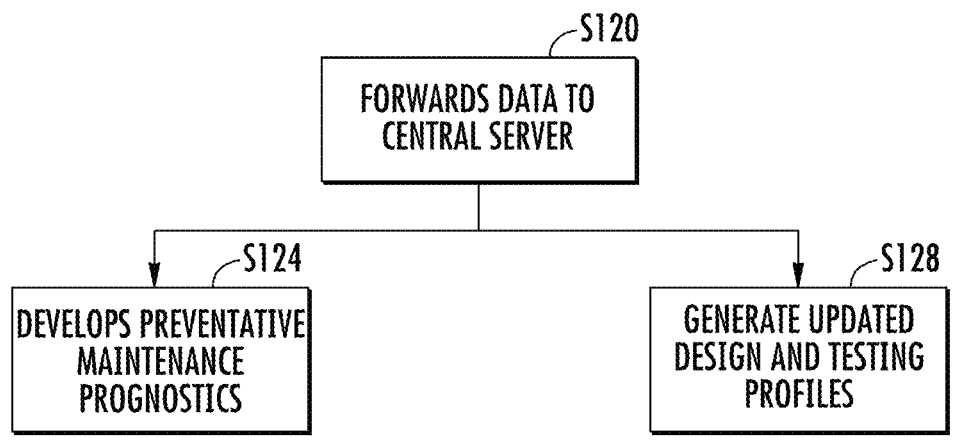
FIG. 3 is a flowchart according to an embodiment.

In one embodiment, the TRU controller may continue from step S116 to step S120 illustrated in FIG. 3, wherein the TRU controller forwards compiled data to the fleet central server, including a historical profile of updated TRU operational baselines which have been accumulated over a period of time. At step S124 the fleet central server may process the complied data to develop preventative maintenance prognostics. At step S128 the compiled data may be processed by the fleet central server to generate updated design and testing profiles. From such processes, initial baselines and control loops may account for expected vibration profiles developed through testing of nominal systems in the laboratory and/or field.

Figure 4:
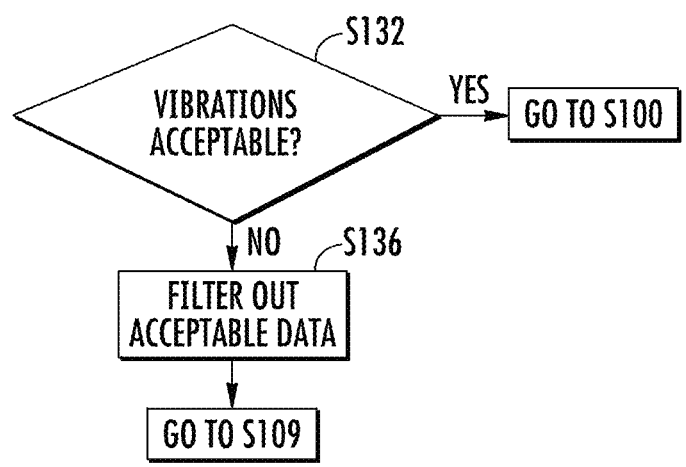
FIG. 4 is a flowchart according to an embodiment.

Turning to FIGS. 1, 2 and 4, upon selecting "yes" at step S109, the TRU controller may first perform step S132 of comparing with first reference data representing acceptable vibrational levels for the TRU components. Expected vibration profiles for the TRU components may be obtained through testing of nominal TRU systems in a laboratory and/or in normal operation. If the determination at step S132 is "yes", then the TRU controller may cycle back to step S100 without processing the data in the control loop. If the determination at step S132 is "no" then the TRU controller may perform step S136 of processing the second data to remove acceptable vibrational data. Then the TRU controller may continue to step S109 as indicated above.

Figure 5:
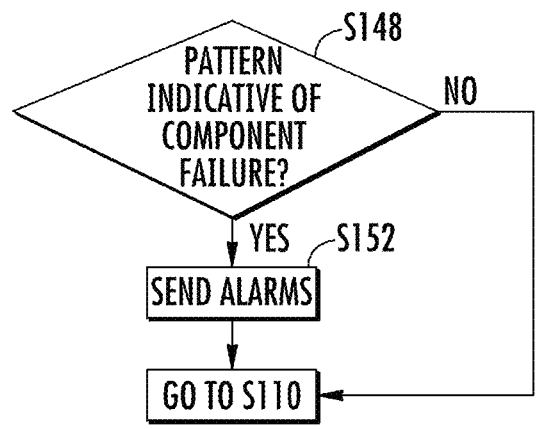
FIG. 5 is a flowchart according to an embodiment.

Turning to FIGS. 1, 2 and 5, upon selecting "yes" at step S110, the TRU controller at step S148 may compare the second data to second reference data containing vibration patterns indicative of near term or actual failure of specific TRU components, such as TRU mounts. When vibration patterns are not indicative of specific component failure, the TRU controller may return to step S110. When the vibration patterns are indicative of specific component failure, at step S152 the TRU controller may actively send an alarm to the central server or the cellular device. The alarm may indicate, for example, that the engine mounts are beginning to wear and need to be replaced, or that a TRU component has failed. This may avoid eventual failure of the mounts, and potential cascading failures. With alarms sent, the TRU controller may advance to step S110. It is to be appreciated that outside of catastrophic failures TRU components may be fixed or replaced at a convenient point during a mission, not necessarily upon sounding of an alarm, which may be at any point during a mission.

Figure 6:
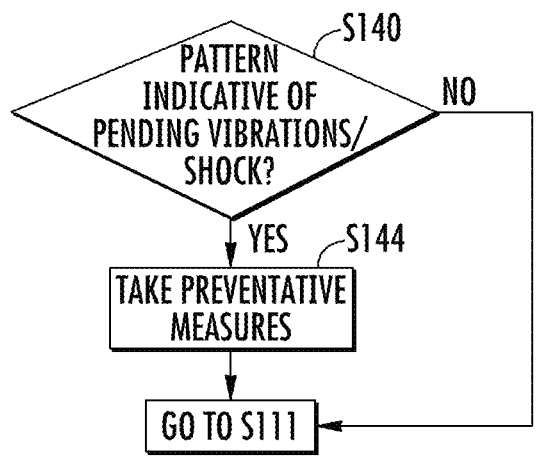
FIG. 6 is a flowchart according to an embodiment.

Turning to FIGS. 1, 2 and 6, upon selecting "yes" at step S111, the TRU controller at step S140 may compare real time data to third reference data containing vibration patterns which are indicative of pending further shock. If the determination is "no" then the TRU controller may continue to step S112. If the determination is "yes" then the TRU controller at step S144 may employ prognostic logic that anticipates shock induced excitations and takes preventative measures to prevent resonant failure modes while in transport. Such active controls may avoid a vibration related failure.

The disclosed embodiments may be performed contemporaneously to provide for proactive identification of excessive vibrations due to resonance driven by TRU engine speeds, and for automatic corrective action before a system or component failure occurs. Additionally the disclosed embodiments may provide smoother engine operations and improved product reliability. Using accelerometers with control algorithms for variable speed TRU engines, system reliability may be improved resulting in lowered operating and/or warranty costs. Also, relatively rapid responses by the TRU controller may avoid damage to the TRU following, for example, a vehicular accident involving the trailer, or an unusual vehicular positioning of the trailer, that may impart impulses, stresses and strains on the TRU. In addition, for example, proactively identifying worn components such as TRU mounts enables changing of such components before such causes (a) excessive unit vibrations, and/or (b) failure of other components in the system, such as an exhaust system, refrigeration pipes, etc.

The term "about" is intended to include the degree of error associated with measurement of the particular quantity based upon the equipment available at the time of filing the application. The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for dynamically mitigating resonance in a transport refrigeration unit (TRU) during a mission, comprising:
    a TRU controller configured for operating a TRU engine during the mission according to initial baseline parameters, including running the TRU engine at a preset operational frequency,
    wherein the TRU comprises TRU components including one or more of TRU engine mounts, an exhaust system and refrigeration pipes; and
    while operating the TRU engine, the TRU controller is further configured to contemporaneously perform steps comprising:
    obtaining a first set of data that comprises real time measurements from one or more accelerometers installed in the TRU;
    converting the real time measurements to a second set of data that comprises real time shock and vibration data;
    comparing the second set of data with first reference data indicative of an acceptable range of vibrations for the TRU components;
    comparing the second set of data with second reference data indicative of component failure;
    processing the second set of data in a control loop to determine updated baseline parameters that avoids resonance detected in the first set of data to run the TRU engine at frequencies that dampen and/or avoid frequencies causing resonance in the TRU components; and
    operating the TRU engine according to the updated baseline parameters.

2. The system of claim 1 wherein the TRU controller forwards one or more of the first set of data, the second set of data and the updated baseline parameters to a fleet central server.

3. The system of claim 2, wherein the fleet central server receives the one or more of the first set of data, the second set of data and the updated baseline parameters and develops one or more of preventative maintenance prognostics and updated design and testing profiles.

4. The system of claim 1 wherein the TRU controller filters, from the second set of data, data indicative of real time shock and vibration data that is within the acceptable vibrational range for the TRU components and the TRU controller processes the filtered second set of data in the control loop to determine the updated baseline parameters that avoids resonance detected in the first set of data.

5. The system of claim 1 wherein the TRU controller triggers an alarm when determining that the second set of data is indicative of failure of one or more of the TRU components.

6. A method for dynamically mitigating resonance in a transport refrigeration unit (TRU) during a mission, comprising:
    a TRU controller operating a TRU engine during the mission according to initial baseline parameters, including running the TRU engine at a preset operational frequency,
    wherein the TRU comprises TRU components including one or more of TRU engine mounts, an exhaust system and refrigeration pipes; and
    while operating the TRU engine, contemporaneously performing steps comprising:
    obtaining a first set of data that comprises real time measurements from one or more accelerometers installed in the TRU;
    converting the real time measurements to a second set of data that comprises real time shock and vibration data;
    comparing the second set of data with first reference data indicative of an acceptable range of vibrations for the TRU components;
    comparing the second set of data with second reference data indicative of component failure;
    processing the second set of data in a control loop (156) to determine updated baseline parameters that avoids resonance detected in the first set of data to run the TRU engine at frequencies that dampen and/or avoid frequencies causing resonance in the TRU components; and
    operating the TRU engine according to the updated operational baseline parameters.

7. The method of claim 6 wherein the TRU controller forwards one or more of the first set of data, the second set of data and the updated baseline parameters to a fleet central server.

8. The method of claim 7, wherein the fleet central server receives the one or more of the first set of data, the second set of data and the updated baseline parameters and develops one or more of preventative maintenance prognostics and updated design and testing profiles.

9. The method of claim 6 wherein the TRU controller filters, from the second set of data, data indicative of real time shock and vibration data that is within the acceptable vibrational range for the TRU components and the TRU controller processes the filtered second set of data in the control loop to determine the updated baseline parameters that avoids resonance detected in the first set of data.

10. The method of claim 6 wherein the TRU controller triggers an alarm when determining that the second set of data is indicative of failure of one or more of the TRU components.

* * * * *